United States Patent
Nomura

(10) Patent No.: US 11,807,191 B2
(45) Date of Patent: Nov. 7, 2023

(54) TICKET HOLDER-EQUIPPED VEHICLE SUN VISOR

(71) Applicant: KYOWA SANGYO CO., LTD., Toyota (JP)

(72) Inventor: Shigeaki Nomura, Nagoya (JP)

(73) Assignee: KYOWA SANGYO CO., LTD., Toyota (JP)

( * ) Notice: Subject to any disclaimer, the term of this patent is extended or adjusted under 35 U.S.C. 154(b) by 584 days.

(21) Appl. No.: 17/040,580

(22) PCT Filed: May 29, 2019

(86) PCT No.: PCT/JP2019/021295
§ 371 (c)(1),
(2) Date: Sep. 23, 2020

(87) PCT Pub. No.: WO2019/230797
PCT Pub. Date: Dec. 5, 2019

(65) Prior Publication Data
US 2021/0070231 A1   Mar. 11, 2021

(30) Foreign Application Priority Data

May 31, 2018  (JP) ................. 2018-105070

(51) Int. Cl.
*B60R 7/08*   (2006.01)
*B60J 3/02*   (2006.01)
*B60R 7/05*   (2006.01)

(52) U.S. Cl.
CPC .............. *B60R 7/08* (2013.01); *B60J 3/0282* (2013.01); *B60R 7/05* (2013.01)

(58) Field of Classification Search
CPC ..... B60R 7/05; B60R 7/08; B60R 2011/0035; B60J 3/0282; B60J 3/0204
See application file for complete search history.

(56) References Cited

U.S. PATENT DOCUMENTS

| | | |
|---|---|---|
| 2,789,782 A | 4/1957 | Huth |
| 3,140,781 A | 7/1964 | Rothgart |
| 5,538,311 A | 7/1996 | Fusco et al. |
| 6,484,365 B1 | 11/2002 | Thompson |
| 2006/0138184 A1 | 6/2006 | Floch et al. |

FOREIGN PATENT DOCUMENTS

| | | | | |
|---|---|---|---|---|
| DE | 297 01 047 U1 | 5/1997 | | |
| DE | 102009057085 A1 | * 6/2011 | ............ | B60J 3/0278 |
| EP | 655359 A1 | * 5/1995 | ............ | B60J 3/0282 |
| EP | 1 676 749 A1 | 7/2006 | | |
| KR | 100527988 B1 | * 11/2005 | | |

* cited by examiner

*Primary Examiner* — Justin M Larson
(74) *Attorney, Agent, or Firm* — Oliff PLC

(57) ABSTRACT

A vehicle sun visor includes: a plate-like visor body, a mirror frame that holds a mirror and is fitted in the visor body; and a ticket holder configured to hold a ticket in cooperation with the visor body. The ticket holder includes a metal clip including metal and a resin clip including resin. The metal clip includes a metal attachment piece directly attached to the visor body, and a metal holding piece extending from the metal attachment piece along a front surface of the visor body. The resin clip includes a resin cover portion extending from one end of the mirror frame and covering the metal holding piece, and a distal end attachment portion that attaches a distal end portion of the resin cover portion to a distal end portion of the metal holding piece.

3 Claims, 9 Drawing Sheets

TICKET HOLDER-EQUIPPED VEHICLE SUN VISOR

TECHNICAL FIELD

The present invention relates to a ticket holder-equipped vehicle sun visor.

BACKGROUND ART

Various types of vehicle sun visors have conventionally known. For example, vehicle sun visors described in Patent Literatures 1 and 2 have been known. The vehicle sun visor described in Patent Literature 1 includes a plate-like visor body, a mirror attached to the visor body, and ticket holders provided on opposite, left and right, sides of the mirror. Each ticket holder extends outward from a left edge or a right edge of a mirror frame covering an outer periphery of the mirror. A thin ticket such as a parking ticket is inserted between the ticket holder and the visor body and the ticket holder holds the ticket. As with the mirror frame, the ticket holders are made of resin.

The vehicle sun visor described in Patent Literature 2 includes a plate-like visor body, a mirror unit attached to the visor body, and a ticket holder adjacent to the mirror unit. The ticket holder includes an attachment piece attached to the visor body, a front piece parallel to the attachment piece, and a connection portion connecting one side portion of the attachment piece and one side portion of the front piece. The front piece is disposed along a front surface of the visor body, and a ticket holder is inserted between the front piece and the visor body. Consequently, a ticket is held by the front piece of the ticket holder and the visor body.

CITATION LIST

Patent Literature

Patent Literature 1: German Utility Model No. 29701047, specification
Patent Literature 2: EP Patent Application Publication No. 1676749, specification

SUMMARY OF THE INVENTION

Technical Problem

Since the ticket holder described in Patent Literature 1 is made of resin, the ticket holder may deform over time. More specifically, the ticket holder may deform as a result of a temperature inside the vehicle repeated becoming high in, for example, summer. As a result of the deformation, a thicket holding force of the ticket holder is decreased. The ticket holder described in Patent Literature 2 is made of metal. In the ticket holder made of metal, edges (corner portions) inherent to metal molded products may be exposed. Therefore, there is a need to provide a structure that prevents exposure of metal edges in consideration of safety. Therefore, there is a conventional need for a vehicle sun visor including a ticket holder that curbs deforming over time and prevents exposure of metal edges.

Solution to Problem

According to a feature of the present disclosure, a vehicle sun visor includes a plate-like visor body, a mirror frame that holds a mirror and is fitted in the visor body, and a ticket holder. The ticket holder is configured to hold a ticket in cooperation with the visor body. The ticket holder includes a metal clip including metal and a resin clip including resin. The metal clip includes a metal attachment piece directly attached to the visor body, and a metal holding piece extending from the metal attachment piece along a front surface of the visor body. The resin clip includes a resin cover portion extending one end of the mirror frame and covering the metal holding piece, and a distal end attachment portion that attaches a distal end portion of the resin cover portion to a distal end portion of the metal holding piece.

Therefore, if the resin clip is repeatedly exposed to a high temperature, the resin clip may deform over time. However, even if the resin clip deforms, the ticket holder includes the metal clip that does not easily deform even if the metal clip is repeatedly exposed to a high temperature. Therefore, even if the ticket holder is repeatedly subjected to a high temperature, the ticket holder does not deform over time much as a whole and can hold a ticket. Since the resin clip covers the metal clip, exposure of edges of the metal clip is prevented by the resin clip. Consequently, damage of opposing members, etc., can be prevented. The metal clip is attached not to the mirror frame but to the visor body. Therefore, a force generated by use of the ticket holder is borne by the visor body via the metal clip. As a result, a force transmitted to the mirror frame is reduced, which prevents deformation of the mirror frame.

The ticket holder generally has a structure that is thin and is difficult to form by means of insert molding in which a metal member is inserted to a resin member. On the other hand, in the configuration of the present disclosure, the resin clip and the metal clip are separate members. In addition, the resin clip extends from the mirror frame and a distal end portion of the resin clip is joined to the metal clip. Therefore, the resin clip is easily and reliably joined to the metal clip. Respective distal ends of the resin clip and the metal clip are attached to each other. Therefore, since the resin clip receives a force from the metal clip, at the distal end, the resin clip generates large torque in cooperation with the metal clip. Therefore, the ticket holder can hold the ticket with a large force by means of the cooperation between the resin clip and the metal clip.

According to another feature of the present disclosure, the metal holding piece includes a holding piece body and a holding piece distal end portion. The holding piece body extends in a direction away from the mirror frame along the front surface of the visor body and obliquely extends toward the visor body in a thickness direction of the visor body. The holding piece distal end portion includes the holding piece distal end portion that extends from a distal end of the holding piece body along the front surface of the visor body and obliquely extends in a direction away from the visor body in the thickness direction of the visor body. The distal end attachment portion of the resin clip includes a holding groove covering a tip of the holding piece distal end portion of the metal holding piece, the holding piece distal end portion being inserted in the holding groove.

Therefore, the distal end of the resin clip and the distal end of the metal clip are integrated by the distal end of the metal clip being inserted to the holding groove of the resin clip. Therefore, the distal ends of both clips are integrated with a simple structure. The holding piece distal end portion extends obliquely relative to the visor body in the direction away from the visor body. Therefore, upon the holding piece distal end portion moving in a direction in which the holding piece distal end portion comes off from the holding groove, a portion of connection between the holding piece body and the holding piece distal end portion hits the visor body. Consequently, the holding piece distal end portion coming off from the holding groove is curbed. Therefore, the holding piece distal end portion of the metal clip is less likely to come off from the holding groove of the resin clip.

According to another feature of the present disclosure, the visor body includes a mirror frame installation portion in which the mirror frame is installed, a metal clip insertion portion, and a lug insertion portion. The metal attachment piece of the metal clip is inserted to the metal clip insertion portion from the mirror frame installation portion. An attachment lug of the mirror frame is inserted to the lug insertion portion from the mirror frame installation portion. The metal attachment piece includes a slit extending in a direction away from the mirror frame. The visor body includes a protrusion portion that slidably enters the slit. The slit and the protrusion portion are configured to, when the metal clip is moved together with the mirror frame in a detachment direction in a state in which the resin clip is attached to the metal clip, prevent the metal clip from coming off from the visor body. The slit is long enough to, when the metal clip is moved together with the mirror frame in the detachment direction in a state in which the resin clip is attached to the metal clip, allow the attachment lug of the mirror frame to come off from the lug insertion portion of the visor body.

Therefore, the mirror frame and the metal clip can easily be assembled to the visor body. More specifically, the metal clip is fitted on the visor body. The resin clip is attached to the metal clip. The metal clip is slid relative to the visor body, together with the mirror frame provided with the resin clip. Consequently, the attachment lug of the mirror frame can be moved to a position at which the attachment lug can be inserted to the lug insertion portion. At this time, the metal clip is prevented from coming off from the visor body. The metal clip and the mirror frame can be attached to the visor body while inserting the attachment lug to the lug insertion portion in that state.

MODES FOR CARRYING OUT THE INVENTION

Figure 1:
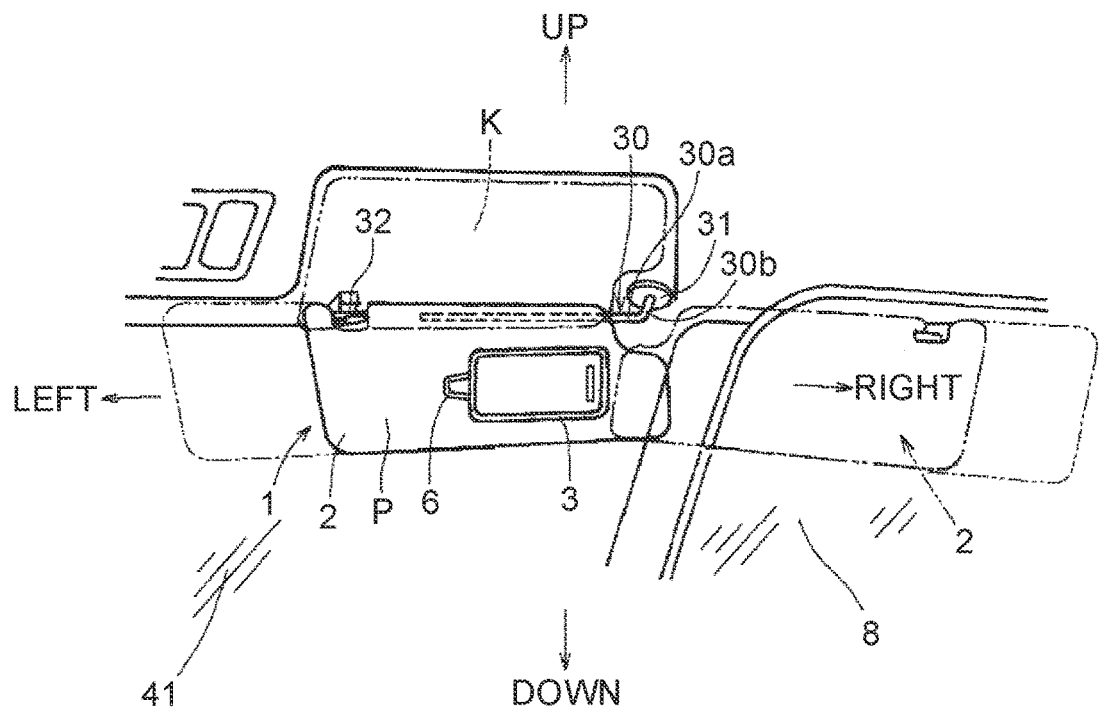
FIG. 1 is a perspective view of a cabin of a passenger vehicle and a ticket holder-equipped vehicle sun visor provided inside the cabin.

An embodiment of the present invention will be described with reference to the drawings. As illustrated in FIG. 1, a vehicle sun visor 1 includes a visor body 2, and a bearing shaft 30 and a support shaft 32 that are fitted in the visor body 2. The bearing shaft 30 has a substantial L-shape formed by a long and straight horizontal shaft 30a and a vertical shaft 30b provided on the proximal end portion side of the horizontal shaft 30a. The vertical shaft 30b is joined to a ceiling surface of a vehicle cabin by a bracket 31 so as to be rotatable around a shaft center. The horizontal shaft 30a is inserted to an upper edge of the visor body 2, and the visor body 2 is rotatable around the horizontal shaft 30a.

As illustrated in FIG. 1, the support shaft 32 is provided at a position coaxial to the horizontal shaft 30a in the visor body 2. As illustrated in FIG. 1, the visor body 2 is rotatable around a shaft center of the bearing shaft 30 (horizontal shaft 30a), between a folded position K at which the visor body 2 extends along the ceiling surface of the vehicle cabin and a use position P at which the visor body 2 extends along a windshield 41 of the vehicle cabin. As indicated by an alternate long and two short dashes line in FIG. 1, the visor body 2 can be moved to a position of a door window 8 by being rotated around the vertical shaft 30b.

Figure 4:
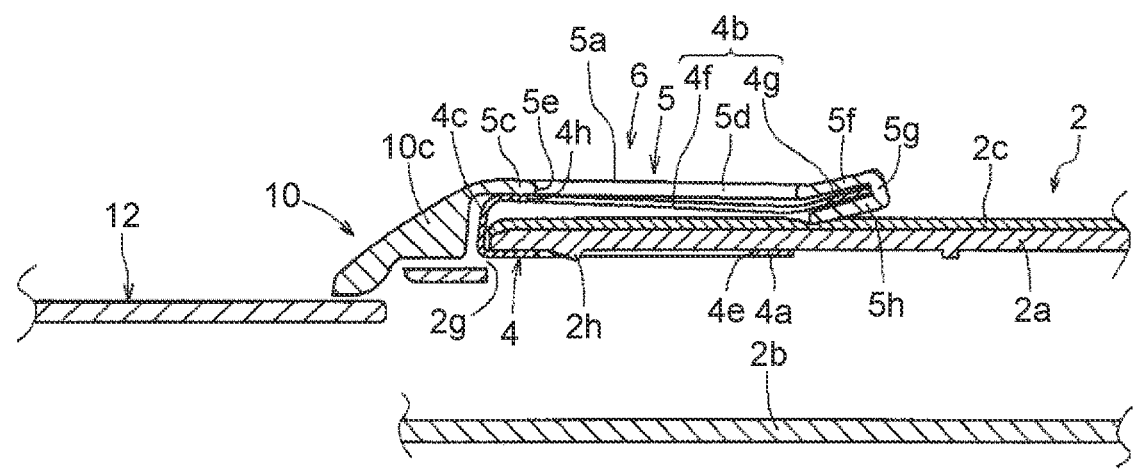
FIG. 4 is a sectional view along a line indicated by arrows IV-IV in FIG. 3.
Figure 5:
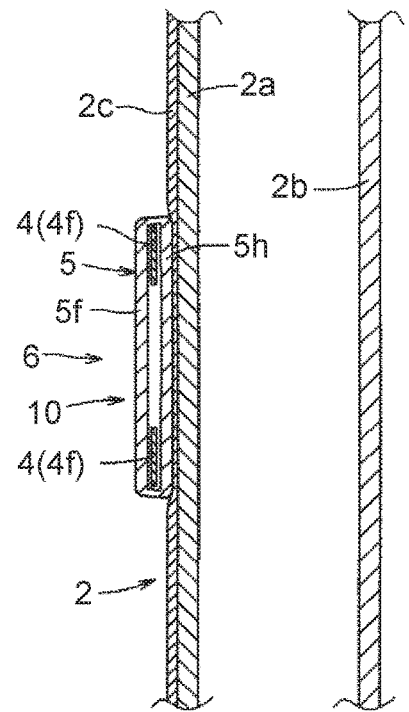
FIG. 5 is a sectional view along a line indicated by arrows V-V in FIG. 3.
Figure 6:
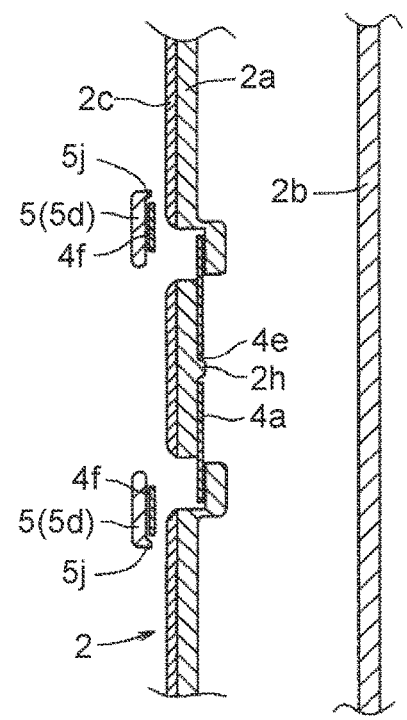
FIG. 6 is a sectional view along a line indicated by arrows VI-VI in FIG. 3.
Figure 9:
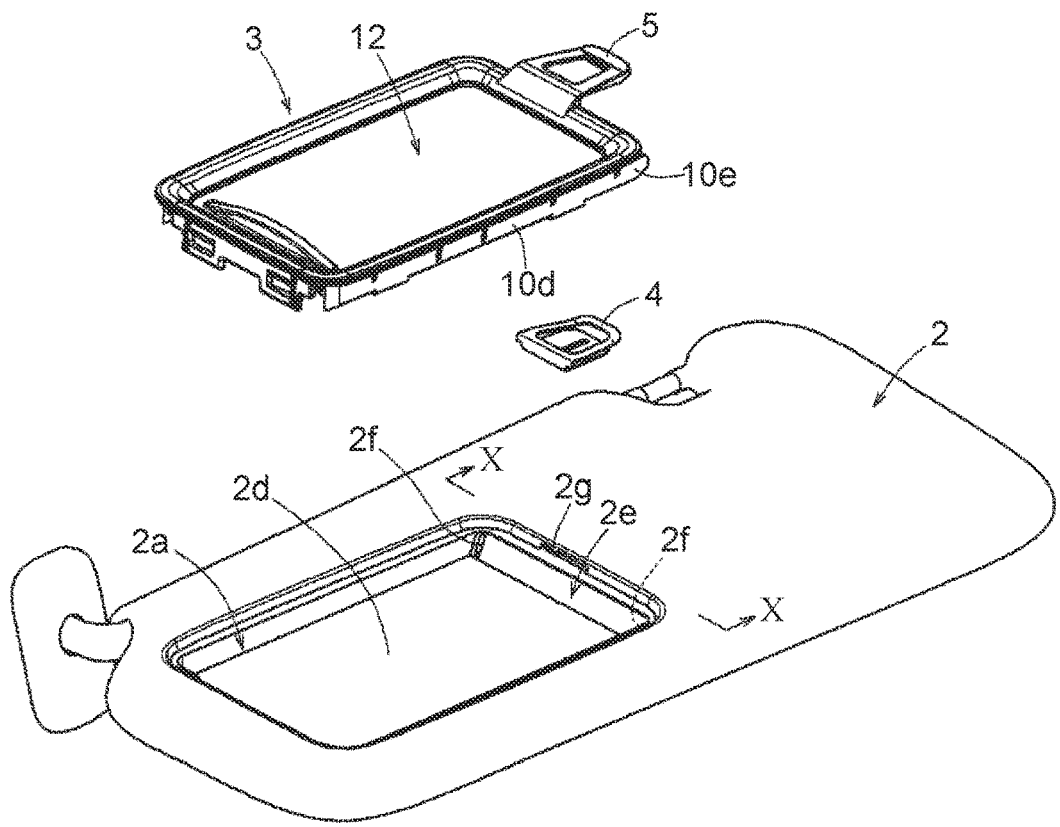
FIG. 9 is a perspective view of a visor body, a metal clip and the mirror unit.
Figure 10:
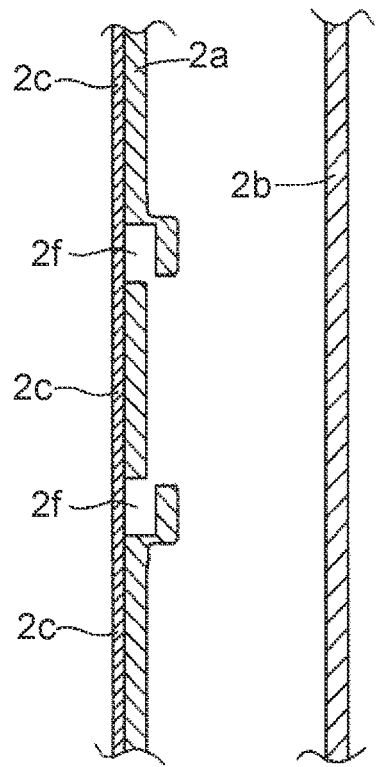
FIG. 10 is a sectional view along a line indicated by arrows X-X in FIG. 9.

As illustrated in FIGS. 4 to 6, the visor body 2 has a hollow plate-like shape and includes a first shell body 2a, a second shell body 2b and a covering 2c covering respective front surfaces of the first shell body 2a and the second shell body 2b. As illustrated in FIG. 9, in the first shell body 2a, a mirror frame installation portion 2d that is recessed toward the inside of the visor body 2 in a thickness direction and has a rectangular shape is formed. In a side surface 2e of the mirror frame installation portion 2d, two lug insertion portions 2f and a metal clip insertion portion 2g are formed. The side surface 2e is located on the side distant from the bracket 31 of the mirror frame installation portion 2d.

Figure 16:
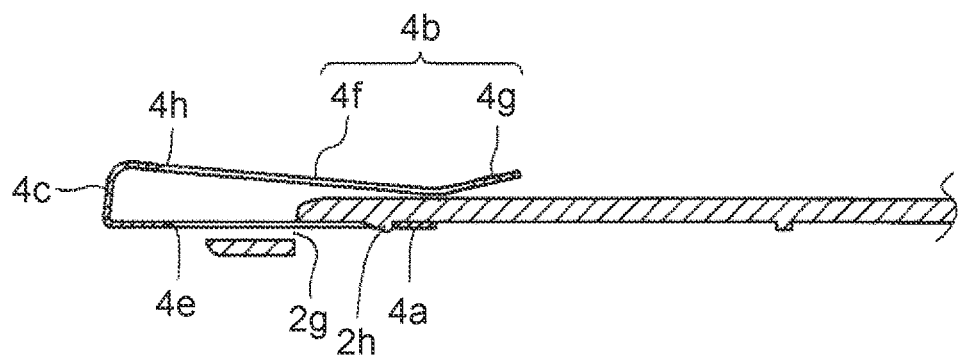
FIG. 16 is a sectional view along a line indicated by arrows XVI-XVI in FIG. 15.

As illustrated in FIG. 9, the two lug insertion portions 2f each have a shape of a rectangular hole. The lug insertion portions 2f are located in upper and lower portions of the side surface 2e of the mirror frame installation portion 2d, respectively. The metal clip insertion portion 2g has a shape of a horizontally-long and thin hole. The metal clip insertion portion 2g is located near a front surface at a center position of the side surface 2e. As illustrated in FIGS. 4, 6 and 16, a protrusion portion 2h is formed in the vicinity of an entrance of the metal clip insertion portion 2g. The protrusion portion 2h protrudes from a back surface of the first shell body 2a toward the inside of the visor body 2.

Figure 2:
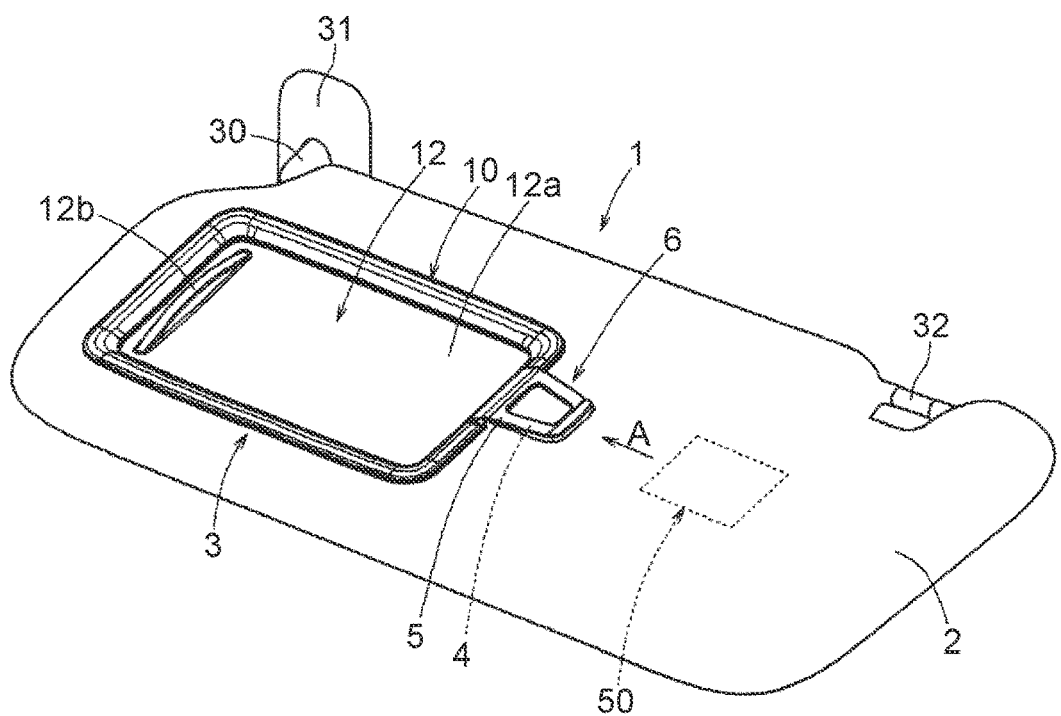
FIG. 2 is a perspective view of the vehicle sun visor.
Figure 7:
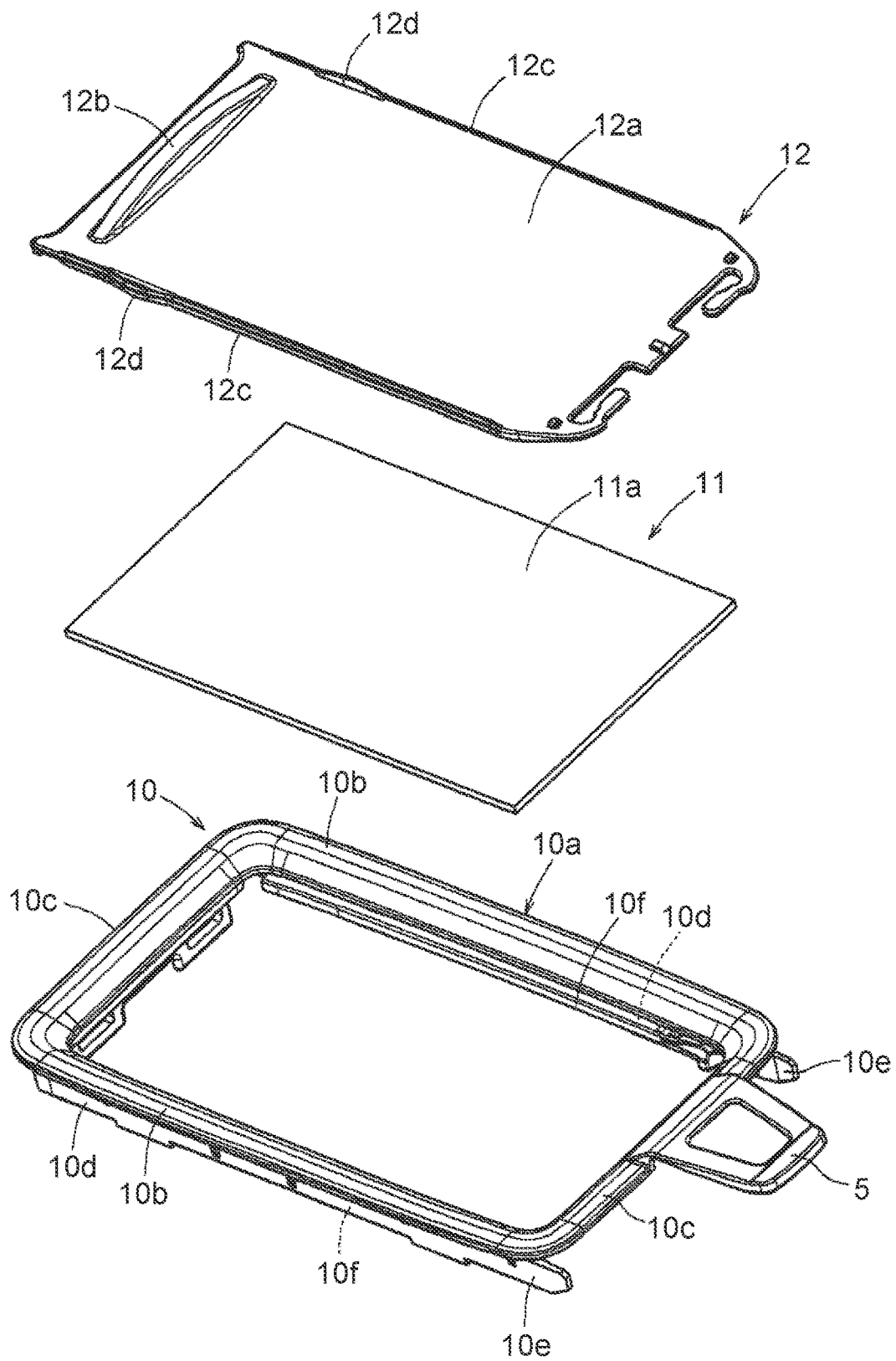
FIG. 7 is an exploded perspective view of a mirror unit.
Figure 8:
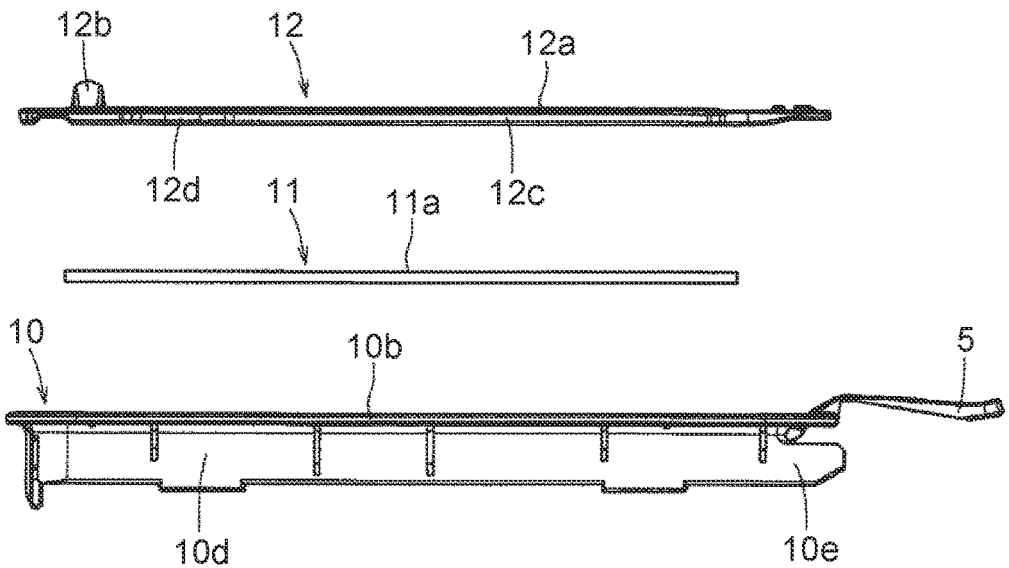
FIG. 8 is an exploded side view of the mirror unit.

As illustrated in FIGS. 2, 7 and 8, the vehicle sun visor 1 includes a mirror unit 3 and a ticket holder 6. The mirror unit 3 includes a rectangular mirror frame 10, a plate-like mirror 11 and a mirror cover 12. The mirror 11 includes a mirror surface 11a at a front surface. The mirror frame 10 includes a frame portion 10a and side walls 10d. The frame portion 10a has a rectangular shape having two long edges 10b and two short edges 10c. At one short edge 10c, a resin clip 5 is formed in an integrated manner. For example, the mirror frame 10 and the resin clip 5 are formed of a single member made of resin. The resin clip 5 extends from the short edge 10c in a direction away from the mirror frame 10.

As illustrated in FIGS. 7 and 8, the side walls 10d are formed along the respective long edges 10b of the mirror frame 10, and a guide groove 10f is formed in each of the side walls 10d. The side walls 10d extend downward from the respective long edges 10b. The upper and lower guide grooves 10f extend in a left-right direction and slidably support upper and lower edges of the support mirror cover 12. The mirror frame 10 includes a pair of attachment lugs 10e for attachment to the visor body 2. The attachment lugs 10e are located at upper and lower portions of the side walls 10d and protrude from the respective side walls 10d toward the outside of the mirror frame 10.

As illustrated in FIGS. 7 and 8, the mirror cover 12 has a plate-like shape and is formed of, for example, resin. The mirror cover 12 has a flat plate-like mirror cover body 12a and a handle portion 12b. Guide portions 12c and resin springs 12d are formed at upper and lower side edges of the mirror cover body 12a. The guide portions 12c are inserted to the respective guide grooves 10f of the mirror frame 10 and supported so as to be slidable relative to the mirror frame 10. The resin springs 12d protrude from the upper and lower side edges of the mirror cover body 12a and each provide an adequate slide resistance by being hit against the mirror frame 10.

As illustrated in FIG. 2, the ticket holder 6 is used for holding a ticket 50 in cooperation with the visor body 2. Examples of the ticket 50 include tickets, admission tickets and other thin plate-like members. The ticket 50 may be made of any material such as paper, resin or metal. A distal end portion of the ticket holder 6 is located off from the visor body 2 and a gap that facilitates insertion of the ticket 50 is formed between the distal end portion and the visor body 2.

As illustrated in FIGS. 4 and 9, the ticket holder 6 includes a metal clip 4 and a resin clip 5. As illustrated in FIGS. 11 to 14, the resin clip 5 is made of resin and includes a resin cover portion 5a and a distal end attachment portion 5b. The resin cover portion 5a includes a proximal end portion 5c joined to one short edge 10c of the mirror frame 10, and two cover bodies 5d extending from the proximal end portion 5c in a direction away from the short edge 10c. As illustrated in FIG. 4, the cover bodies 5d extend from the proximal end portion 5c along the visor body 2 and obliquely extend toward the visor body 2 in a thickness direction toward the visor body 2. Each cover body 5d includes a side wall 5j provided in a standing manner along a side of the cover body 5d. As illustrated in FIGS. 11 to 14, the cover bodies 5d are formed in such a manner that a distance between the cover bodies 5d becomes smaller toward respective distal ends. An opening portion 5e is formed in a center of the resin cover portion 5a. The opening portion 5e is surrounded by the proximal end portion 5c, the two cover bodies 5d and the distal end attachment portion 5b.

Figure 11:
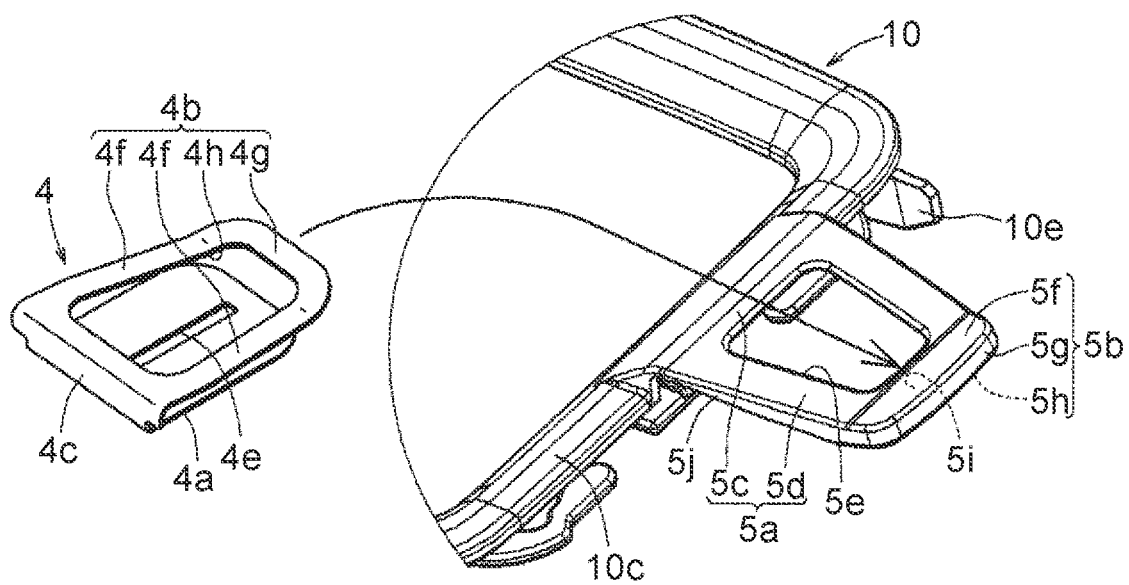
FIG. 11 is an exploded perspective diagram of a part of the mirror unit, a resin clip, and the metal clip as viewed from the front side.
Figure 12:
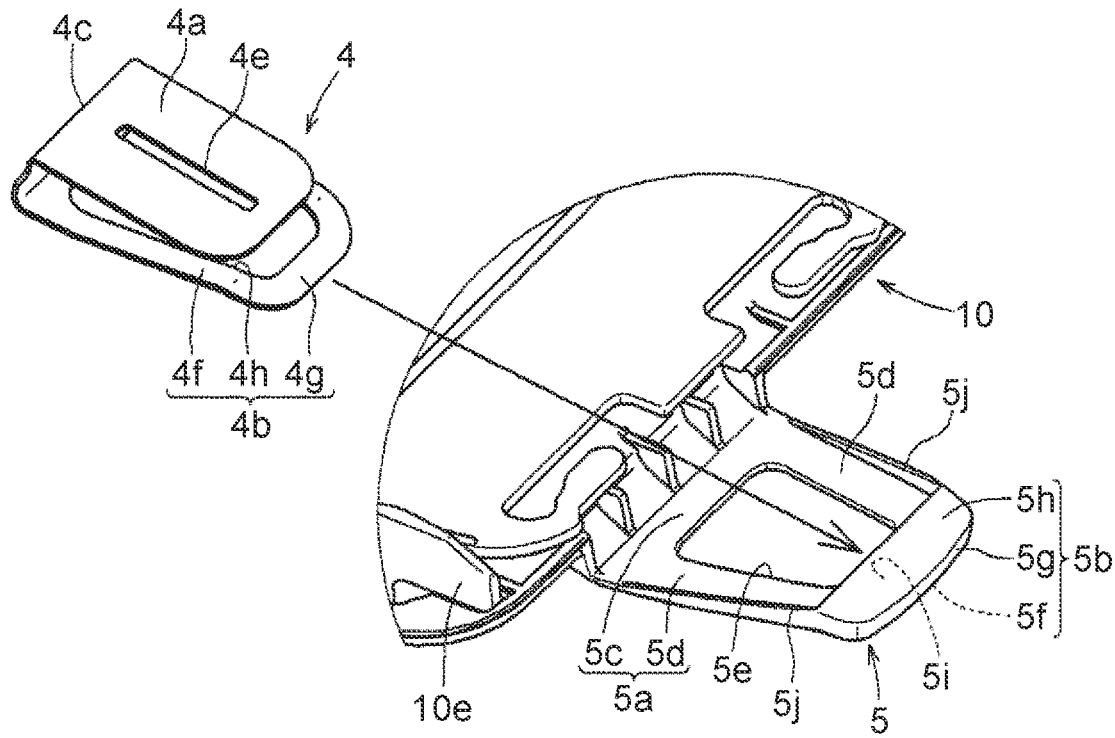
FIG. 12 is an exploded perspective diagram of a part of the mirror unit, the resin clip, and the metal clip as viewed from the back side.
Figure 13:
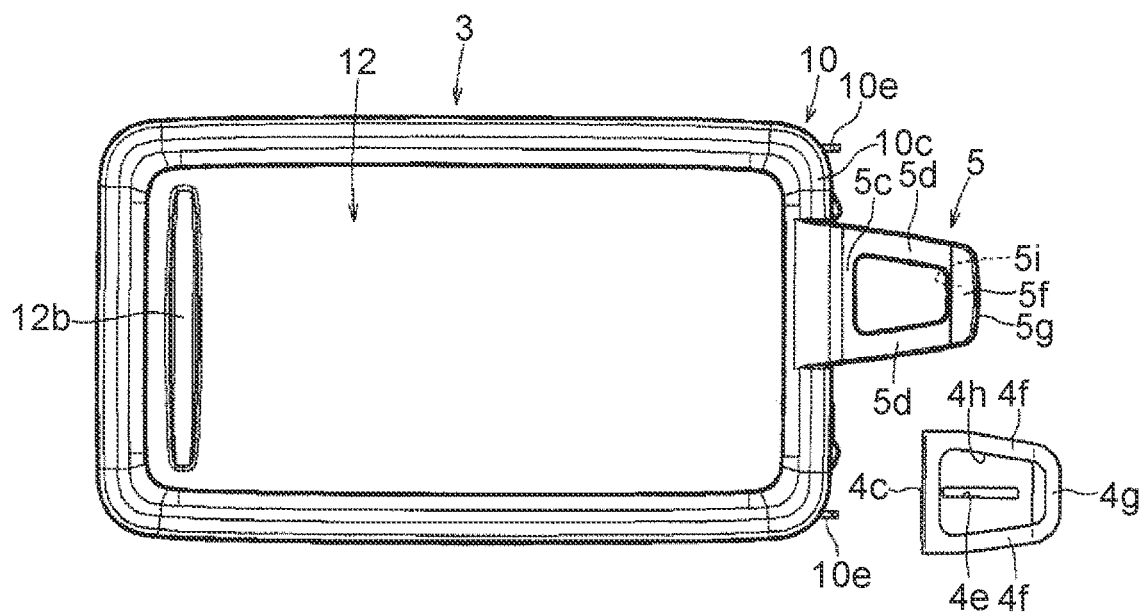
FIG. 13 is an exploded top view of the mirror unit and the metal clip.

As illustrated in FIGS. 4, 11 and 12, the distal end attachment portion 5b of the resin clip 5 includes a holding groove 5i that allows insertion of a distal end of the metal clip 4. The holding groove 5i is formed by an upper cover portion 5f, a distal end portion 5g and a lower cover portion 5h of the distal end attachment portion 5b. The upper cover portion 5f extends from the distal ends of the cover bodies 5d and obliquely extends in a direction away from the visor body 2. The lower cover portion 5h is provided side by side with the upper cover portion 5f and located closer to the visor body 2 than the upper cover portion 5f. The distal end portion 5g connects a distal end of the upper cover portion 5f and a distal end of the lower cover portion 5h. The holding groove 5i opens toward the opening portion 5e and receives the distal end of the metal clip 4 moving from the proximal end portion 5c toward the distal end attachment portion 5b.

As illustrated in FIGS. 11 to 14, the metal clip 4 has a shape of a metal plate and includes a metal attachment piece 4a, a metal holding piece 4b and a connecting piece 4c. The metal attachment piece 4a and the metal holding piece 4b are provided side by side so as to face each other. One end piece of the metal attachment piece 4a and one end piece of the metal holding piece 4b are connected by the connecting piece 4c. A slit 4e is formed in a center of the metal attachment piece 4a. The slit 4e extends from the vicinity of the connecting piece 4c in a direction away from the connecting piece 4c. A length of the slit 4e is set to be longer than that of the attachment lugs 10e of the mirror frame 10. As illustrated in FIG. 4, the protrusion portion 2h of the visor body 2 is inserted to the slit 4e by the metal attachment piece 4a being fitted on the visor body 2.

As illustrated in FIGS. 11 to 14, the metal holding piece 4b extends from an upper end of the connecting piece 4c in a direction that is the same as a direction in which the metal attachment piece 4a extends. The metal holding piece 4b includes two holding piece bodies (holding arms) 4f and a holding piece distal end portion 4g. The holding piece bodies 4f extend from the connecting piece 4c along the metal attachment piece 4a and obliquely extend toward the metal attachment piece 4a. The holding piece distal end portion 4g connects respective end portions of the two holding piece bodies 4f and obliquely extends from the holding piece bodies 4f in a direction away from the metal attachment piece 4a. The metal holding piece 4b includes an opening portion 4h in a center. The opening portion 4h is surrounded by the holding piece bodies 4f and the holding piece distal end portion 4g. The distal end of the metal clip 4 and a distal end of the resin clip 5 are connected by the holding piece distal end portion 4g being inserted to the holding groove 5i of the resin clip 5.

Figure 15:
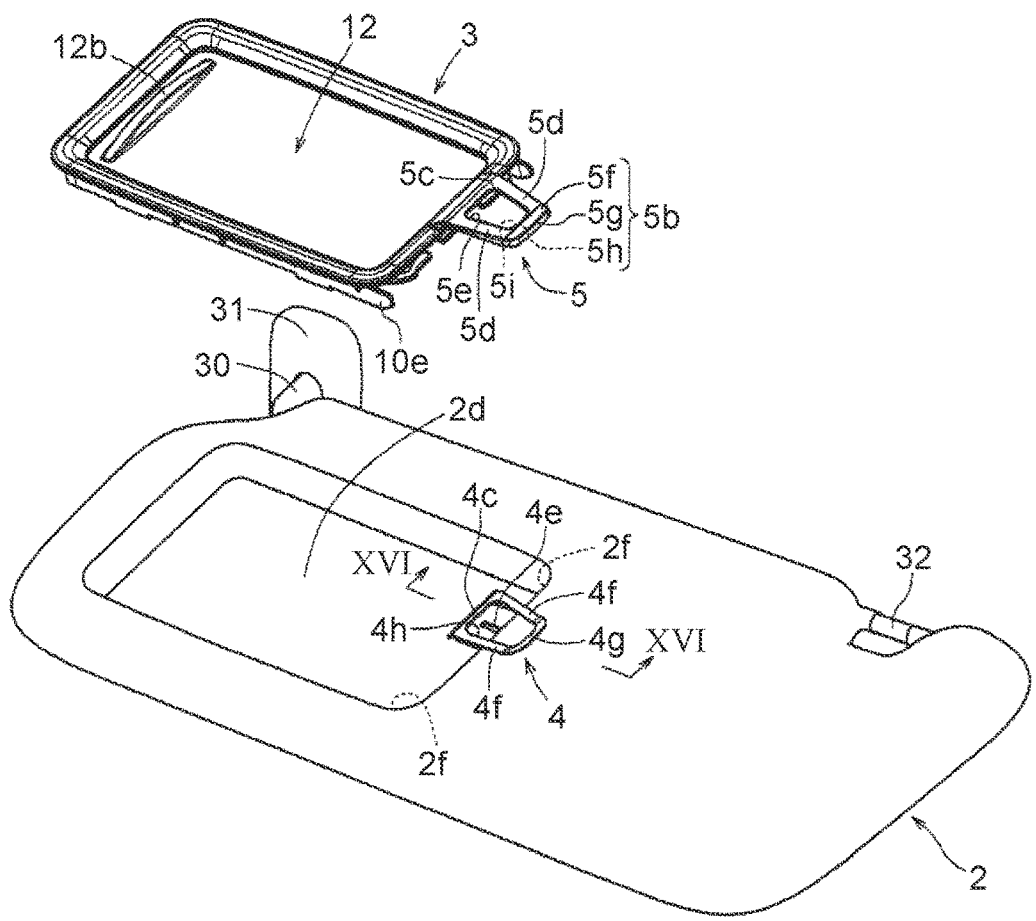
FIG. 15 is a perspective view illustrating a state in which the metal clip is attached to the visor body.
Figure 17:
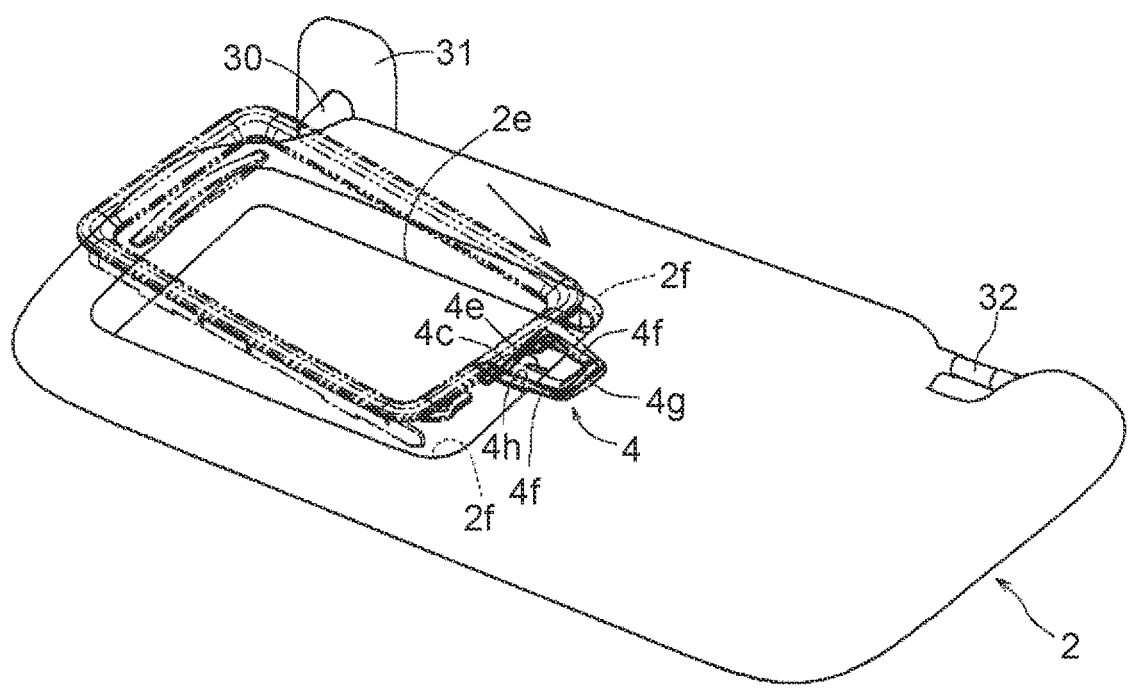
FIG. 17 is a perspective view illustrating a state in which the mirror unit is attached to the metal clip.

A method for assembling the metal clip 4 and the mirror unit 3 to the visor body 2 will be described. As illustrated in FIGS. 15 to 17, the metal clip 4 is assembled to the visor body 2, and next, the mirror unit 3 is assembled to the visor body 2. More specifically, the metal attachment piece 4a of the metal clip 4 is inserted to the metal clip insertion portion 2g (see FIG. 9) of the visor body 2. The protrusion portion 2h of the visor body 2 enters the slit 4e of the metal clip 4. Consequently, the slit 4e and the protrusion portion 2h prevent the metal clip 4 fitted on the visor body 2 from coming off from the visor body 2.

As illustrated in FIGS. 15 to 17, the metal clip 4 is tentatively held in a state in which the metal attachment piece 4a is half inserted in the visor body 2. The distal end attachment portion 5b of the resin clip 5 integrated with the mirror frame 10 is attached to the holding piece distal end portion 4g of the metal clip 4. More specifically, as illustrated in FIGS. 4, 11 and 12, the resin clip 5 is moved relative to the metal clip 4 from the holding piece distal end portion 4g toward the connecting piece 4c (leftward direction in FIG. 17). Consequently, the holding piece distal end portion 4g of the metal clip 4 is inserted to the holding groove 5i of the distal end attachment portion 5b.

Upon the movement in the leftward direction in FIG. 17, an end portion of the slit 4e of the metal clip 4 comes into abutment with the protrusion portion 2h of the visor body 2. Consequently, the metal clip 4 is located at a position reached after a maximum amount of movement relative to the visor body 2 in a direction in which the metal clip 4 is detached. At this time, the attachment lugs 10e of the mirror frame 10 are located at respective standby positions at which the attachment lugs 10e can be inserted to the lug insertion portions 2f of the visor body 2. The attachment lugs 10e are inserted to the lug insertion portions 2f of the visor body 2 by moving the mirror unit 3 in a direction in which the mirror unit 3 is attached to the visor body 2 (arrow direction in FIG. 17). Consequently, the metal clip 4 attached to the resin clip 5 is assembled to the visor body 2 together with the mirror unit 3.

Figure 3:
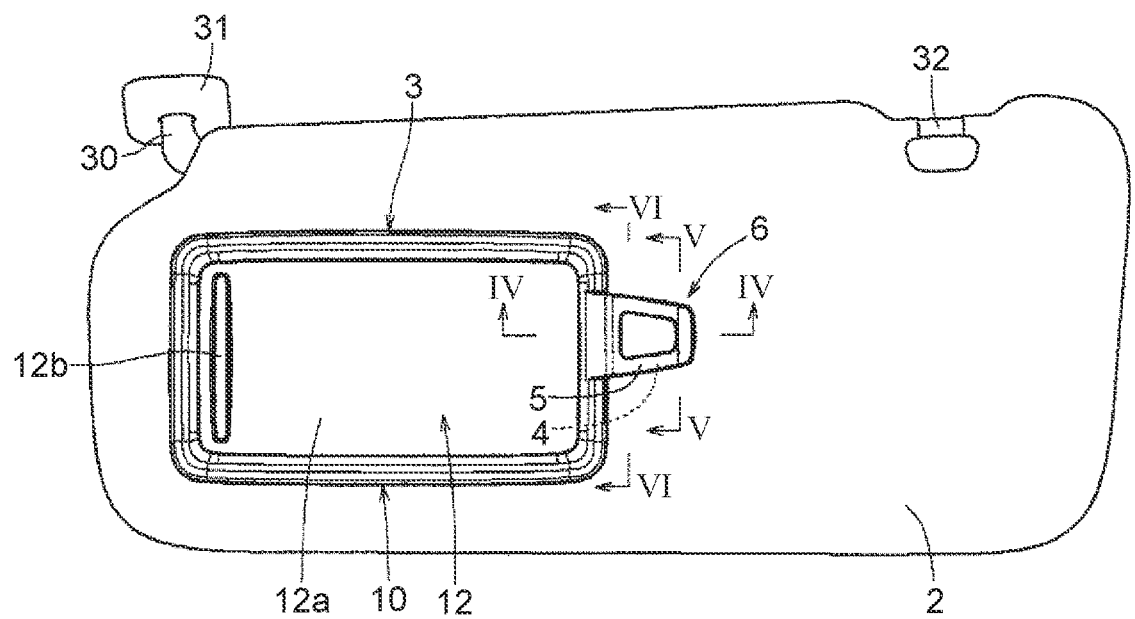
FIG. 3 is a top view of the vehicle sun visor.

As illustrated in FIGS. 3 and 4, the ticket holder 6 includes a metal clip 4 made of metal and a resin clip 5 made of resin. The metal clip 4 includes the metal attachment piece 4a directly attached to the visor body 2 and the metal holding piece 4b extending from the metal attachment piece 4a along the front surface of the visor body 2. The resin clip 5 includes the resin cover portion 5a extending from one end of the mirror frame 10 and covering the metal holding piece 4b, and the distal end attachment portion 5b that attaches the distal end portion 5g of the resin cover portion 5a to the holding piece distal end portion 4g of the metal holding piece 4b.

Therefore, if the resin clip 5 is repeatedly exposed to a high temperature, the resin clip 5 may deform over time. However, even if the resin clip 5 deforms, the ticket holder 6 includes the metal clip 4 that does not easily deform even if the metal clip 4 is repeatedly exposed to a high temperature. Therefore, even if the ticket holder 6 is repeatedly exposed to a high temperature, the ticket holder 6 does not deform over time much as a whole and can hold a ticket. Since the resin clip 5 covers the metal clip 4, exposure of edges of the metal clip 4 is prevented by the resin clip 5. Consequently, damage of opposing members, etc., can be prevented. The metal clip 4 is attached not to the mirror frame 10 but to the visor body 2. Therefore, a force generated by use of the ticket holder 6 is borne by the visor body 2 via the metal clip 4. As a result, a force transmitted to the mirror frame 10 is reduced, which prevents deformation of the mirror frame 10.

The ticket holder 6 is generally thin and is difficult to form by means of insert molding in which a metal member is inserted to a resin member. On the other hand, as illustrated in FIGS. 4 and 11, in the configuration of the present disclosure, the resin clip 5 and the metal clip 4 are separate members. In addition, the resin clip 5 extends from the mirror frame 10 and the distal end portion of the resin clip 5 is joined to the metal clip 4. Therefore, the resin clip 5 is easily and reliably joined to the metal clip 4. As illustrated in FIGS. 4 and 5, the respective distal ends of the resin clip 5 and the metal clip 4 are attached to each other. Therefore, since the resin clip 5 receives a force from the metal clip 4, at the distal end, the resin clip 5 generates large torque in cooperation with the metal clip 4. Therefore, the ticket holder 6 can hold the ticket 50 with a large force by means of the cooperation between the resin clip 5 and the metal clip 4.

As illustrated in FIG. 4, the metal holding piece 4b includes the holding piece bodies 4f and the holding piece distal end portion 4g. The holding piece bodies 4f extend in a direction away from the mirror frame 10 along the front surface of the front surface of the visor body 2 and obliquely extend toward the visor body 2 in the thickness direction of the visor body 2. The holding piece distal end portion 4g includes the holding piece distal end portion 4g that extends from the distal ends of the holding piece bodies 4f along the front surface of the visor body 2 and obliquely extends in a direction away from the visor body 2 in the thickness direction of the visor body 2. As illustrated in FIGS. 11 to 14, the distal end attachment portion 5b of the resin clip 5 includes the holding groove 5i to which the holding piece distal end portion 4g is inserted, and the distal end attachment portion 5b covering the tip of the holding piece distal end portion 4g of the metal holding piece 4b.

Therefore, the distal end (distal end attachment portion 5b formed of the upper cover portion 5f, the distal end portion 5g and the lower cover portion 5h) of the resin clip 5 and the distal end (holding piece distal end portion 4g) of the metal clip 4 are integrated by the distal end (holding piece distal end portion 4g) of the metal clip 4 being inserted to the holding groove 5i of the resin clip 5. Therefore, the distal ends of both clips are integrated with a simple structure. The holding piece distal end portion 4g extends obliquely relative to the visor body 2 in the direction away from the visor body 2. Therefore, upon the holding piece distal end portion 4g moving in a direction in which the holding piece distal end portion 4g comes off from the holding groove 5i, respective portions of connection between the holding piece bodies 4f and the holding piece distal end portion 4g hit the visor body 2. Consequently, the holding piece distal end portion 4g coming off from the holding groove 5i is curbed. Therefore, the holding piece distal end portion 4g of the metal clip 4 is less likely to come off from the holding groove 5i of the resin clip 5.

As illustrated in FIGS. 9 and 15 to 17, the visor body 2 includes the mirror frame installation portion 2d in which the mirror frame 10 is installed, the metal clip insertion portion 2g, and the lug insertion portions 2f. The metal attachment piece 4a of the metal clip is inserted to the metal clip insertion portion 2g from the mirror frame installation portion 2d. The attachment lugs 10e of the mirror frame 10 are inserted to the lug insertion portions 2f from the mirror frame installation portion 2d. The metal attachment piece 4a includes the slit 4e extending in a direction away from the mirror frame. The visor body 2 includes a protrusion portion 2h that slidably enters the slit 4e. The slit 4e and the protrusion portion 2h are configured to, when the metal clip 4 is moved together with the mirror frame 10 in the detachment direction in a state in which the resin clip 5 is attached to the metal clip 4, prevent the metal clip 4 from coming off from the visor body 2. The slit 4e is long enough to, when the metal clip 4 is moved together with the mirror frame 10 in the detachment direction in a state in which the resin clip 5 is attached to the metal clip 4, allow the attachment lugs 10e of the mirror frame 10 to come off from the lug insertion portions 2f of the visor body 2.

Therefore, the mirror frame 10 and the metal clip 4 can easily be assembled to the visor body 2. More specifically, the protrusion portion 2h of the visor body 2 prevents the metal clip 4 from coming off from the visor body 2. The metal clip and the mirror frame can be attached to the visor body while inserting the attachment lugs 10e to the lug insertion portions 2f in that state. Also, the length of the slit 4e is set to be longer than that of the attachment lugs 10e of the mirror frame 10. Therefore, where the distal end attachment portion 5b of the resin clip 5 is attached to the holding piece distal end portion 4g of the metal clip 4 in a state in which the metal clip 4 is half inserted in the metal clip insertion portion 2g, the attachment lugs 10e are located off from the lug insertion portion. Therefore, the metal clip 4 and the mirror frame 10 (mirror unit 3) can smoothly be attached to the visor body.

As illustrated in FIG. 4, the resin cover portion 5a of the resin clip 5 covers an entire periphery of the metal holding piece 4b of the metal clip 4 from the opposite side of the metal holding piece 4b from the visor body 2. Consequently, metal edges of the metal clip 4 can reliably be covered. More specifically, as illustrated in FIGS. 6 and 12, front surfaces of the metal clip 4 are covered by the cover body 5d. Sides of the metal clip 4 are covered by the side walls 5j. As illustrated in FIG. 4, the holding piece distal end portion 4g is covered by the upper cover portion 5f, the distal end portion 5g and the lower cover portion 5h forming the holding groove 5i.

The present invention is not limited to the outer appearance and configuration described in the above embodiment and various changes, additions and deletions are possible without departing from the spirit of the present device. A shell body of the visor body 2 is formed of two members and has a hollow plate-like shape. Instead, the shell body of the visor body 2 may have a hollow plate-like shape formed of a single member or a solid plate-like shape. A material of the shell body of the visor body 2 may be a stiff resin material or a foam resin material such as a polypropylene foam.

As illustrated in FIG. 2, the mirror unit 3 includes the mirror cover 12 slidably provided in the mirror frame 10. Instead, the mirror unit 3 may include a mirror cover rotatably joined to one edge, for example, any of upper, lower and left edges, of the mirror frame 10. Such type of mirror cover moves to a closed position at which the mirror cover covers a mirror and an open position at which the mirror is exposed, by the mirror cover being rotated relative to a mirror frame. Alternatively, the mirror unit 3 may include no mirror cover 12.

As illustrated in FIGS. 2, 7 and 8, the resin clip 5 extends from one short edge 10c of the mirror frame 10. Instead, the resin clip 5 may extend from a long edge 10b of the mirror frame 10. The resin clip 5 and the mirror frame 10 are formed of a single member. Instead, the resin clip 5 may be formed as a member that is separate from the mirror frame 10 and be attached to the mirror frame 10.

As illustrated in FIGS. 4, 11 and 12, the resin clip 5 includes the holding groove 5i formed in the distal end attachment portion 5b. Instead, the resin clip 5 may include an engagement lug that engages with the holding piece distal end portion 4g of the metal clip or an engagement recess portion to which a protrusion portion formed at the holding piece distal end portion 4g is inserted, at the distal end attachment portion 5b.

As illustrated in FIGS. 4 and 16, the metal holding piece 4b of the metal clip 4 is attached to the visor body 2 by being inserted to the visor body 2 from the metal clip insertion portion 2g. Instead, the metal holding piece 4b may be attached to a holding plate, such as a metal plate, provided on the visor body 2.

As illustrated in FIG. 4, the metal clip 4 is flexed in the thickness direction of the visor body 2, that is, flexed in a side view. Instead, the metal clip 4 may have a substantially linear shape in a side view. As illustrated in FIG. 11, the metal clip 4 includes the opening portion 4h in the center. Instead, the metal clip 4 may include no opening portion 4h.

Figure 14:
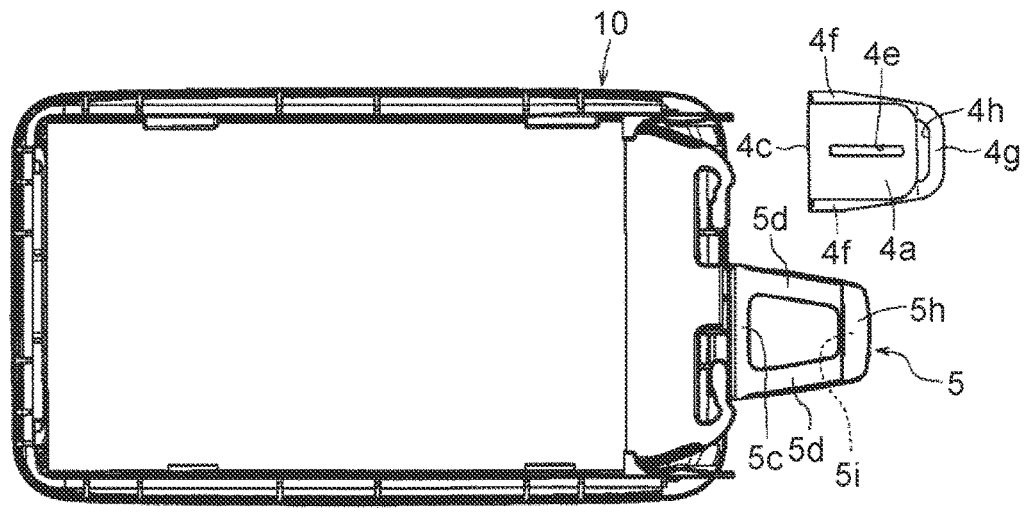
FIG. 14 is an exploded back view of the mirror unit and the metal clip.

As illustrated in FIGS. 14 and 16, the metal attachment piece 4a includes the slit 4e and the visor body 2 includes the protrusion portion 2h that allows the slit 4e to slidably enter the protrusion portion 2h. Instead, the metal attachment piece 4a may include a protrusion portion and the visor body 2 may include a slit to which the protrusion portion is inserted. By means of this configuration, the metal attachment piece 4a may be attached to the visor body 2 in such a manner that the metal attachment piece 4a is slidable relative to, and is prevented from coming off from, the visor body 2.

As illustrated in FIGS. 15 to 17, the resin clip 5 formed at the mirror frame 10 is assembled to the metal clip 4 after the metal clip 4 being assembled to the visor body 2. Instead, as indicated by an arrow in FIG. 12, the metal clip 4 may be assembled to the resin clip 5 and then the metal clip 4 and the mirror unit 3 may be assembled to the visor body 2 at the same time, with the resin clip 5 and the metal clip 4 kept integrated.

REFERENCE SIGNS LIST

1 VEHICLE SUN VISOR
2 VISOR BODY
2d MIRROR FRAME INSTALLATION PORTION
2f LUG INSERTION PORTION
2g METAL CLIP INSERTION PORTION
2h PROTRUSION PORTION
4 METAL CLIP
4a METAL ATTACHMENT PIECE
4b METAL HOLDING PIECE
4e SLIT
4f HOLDING PIECE BODY (HOLDING ARM)
4g HOLDING PIECE DISTAL END PORTION
5 RESIN CLIP
5a RESIN COVER PORTION
5b DISTAL END ATTACHMENT PORTION
5i HOLDING GROOVE
6 TICKET HOLDER
10 MIRROR FRAME

The invention claimed is:

1. A ticket holder-equipped vehicle sun visor comprising:
a plate-like visor body;
a mirror frame that holds a mirror and is fitted in the visor body; and
a ticket holder configured to hold a ticket in cooperation with the visor body, wherein
the ticket holder includes a metal clip including metal and a resin clip including resin,
the metal clip includes a metal attachment piece directly attached to the visor body, and a metal holding piece extending from the metal attachment piece along a front surface of the visor body, and
the resin clip includes a resin cover portion extending from one end of the mirror frame and covering the metal holding piece, and a distal end attachment portion that attaches a distal end portion of the resin cover portion to a distal end portion of the metal holding piece.

2. The ticket holder-equipped vehicle sun visor according to claim 1, wherein:
the metal holding piece includes: a holding piece body extending in a direction away from the mirror frame along the front surface of the visor body and obliquely extending toward the visor body in a thickness direction of the visor body, and a holding piece distal end portion extending from a distal end of the holding piece body along the front surface of the visor body and obliquely extending in a direction away from the visor body in the thickness of the visor body; and
the distal end attachment portion of the resin clip includes a holding groove covering a tip of the holding piece distal end portion of the metal holding piece, the holding piece distal end portion being inserted in the holding groove.

3. The ticket holder-equipped vehicle sun visor according to claim 1, wherein:
- the visor body includes a mirror frame installation portion in which the mirror frame is installed, a metal clip insertion portion to which the metal attachment piece of the metal clip is inserted from the mirror frame installation portion, and a lug insertion portion to which an attachment lug of the mirror frame is inserted from the mirror frame installation portion;
- the metal attachment piece includes a slit extending in a direction away from the mirror frame;
- the visor body includes a protrusion portion that slidably enters the slit;
- the slit and the protrusion portion are configured to, when the metal clip is moved together with the mirror frame in a detachment direction in a state in which the resin clip is attached to the metal clip, prevent the metal clip from coming off from the visor body; and
- the slit is long enough to, when the metal clip is moved together with the mirror frame in the detachment direction in a state in which the resin clip is attached to the metal clip, allow the attachment lug of the mirror frame to come off from the lug insertion portion of the visor body.

* * * * *